(12) United States Patent
Thottupurathu

(10) Patent No.: US 7,767,745 B2
(45) Date of Patent: Aug. 3, 2010

(54) METHODS OF MAKING A MIXTURE FOR A PTFE MEMBRANE WITH METAL OXIDES, AND COMPOSITIONS RELATED THERETO

(75) Inventor: Gopakumar Thottupurathu, Overland Park, KS (US)

(73) Assignee: General Electric Co., Schenectady, NY (US)

( * ) Notice: Subject to any disclaimer, the term of this patent is extended or adjusted under 35 U.S.C. 154(b) by 0 days.

(21) Appl. No.: 12/037,404

(22) Filed: Feb. 26, 2008

(65) Prior Publication Data

US 2009/0230585 A1    Sep. 17, 2009

(51) Int. Cl.
    *C08K 3/18* (2006.01)

(52) U.S. Cl. .................. 524/432; 524/430; 524/431; 524/433; 524/544; 524/545; 524/546

(58) Field of Classification Search .......... 524/430, 524/431, 432, 433, 544, 545, 546
See application file for complete search history.

(56) References Cited

U.S. PATENT DOCUMENTS

| 4,824,898 | A | * | 4/1989 | Sukigara et al. ............. 524/401 |
| 5,697,390 | A | | 12/1997 | Garrison et al. |
| 5,827,327 | A | | 10/1998 | McHaney et al. |
| 5,886,066 | A | * | 3/1999 | Forschirm ................ 523/200 |
| 6,120,532 | A | | 9/2000 | Goldfarb |
| 6,218,000 | B1 | | 4/2001 | Rudolf et al. |
| 6,270,707 | B1 | | 8/2001 | Hori et al. |
| 6,416,840 | B1 | * | 7/2002 | Miyamori et al. .......... 428/66.4 |
| 6,476,116 | B1 | * | 11/2002 | Egami et al. ............. 524/495 |
| 2006/0142467 | A1 | * | 6/2006 | Park ......................... 524/495 |

FOREIGN PATENT DOCUMENTS

WO    WO 20061117976    11/2006

OTHER PUBLICATIONS

U.S. Appl. No. 12/037,501.
Great Britain Search Report issued for Great Britain Patent Application No. GB0902515.6, dated Jul. 7, 2009.
Great Britain Search Report issued for Great Britain Patent Application No. GB0902513.1, dated Nov. 27, 2009.

* cited by examiner

*Primary Examiner*—Bernard Lipman
(74) *Attorney, Agent, or Firm*—Nixon & Vanderhye P.C.

(57) ABSTRACT

Method for making a mixture used in the production of a polytetrafluoroethylene (PTFE) membrane including metal oxide(s). The mixture includes PTFE resin, a lubricating agent, and a metal oxide. The mixture may be further processed to form a PTFE membrane.

4 Claims, No Drawings

METHODS OF MAKING A MIXTURE FOR A PTFE MEMBRANE WITH METAL OXIDES, AND COMPOSITIONS RELATED THERETO

STATEMENT REGARDING FEDERALLY SPONSORED RESEARCH AND DEVELOPMENT

This invention was made with Government support under contract number W911-QY-05-C-0102 awarded by U.S. Army Natick Soldier Research Development and Engineering Center, Natick, Mass. The Government has certain rights in this invention.

BACKGROUND OF THE INVENTION

Embodiments of the present invention generally relate to making an expanded polytetrafluoroethylene (ePTFE) membrane containing metal oxide(s).

Materials including polytetrafluoroethylene (PTFE) are known in the art. PTFE has various well-established uses, including, for example, applications requiring lubricity (e.g., bearings, bushings, etc.) and applications requiring a porous membrane. These membrane-related applications may include, for example, filtration, venting, and/or diffusion/barrier applications. Filtration may use discs or sheets.

Additive-containing PTFE products are known. See, e.g., U.S. Pat. No. 5,697,390 to Garrison et al.; U.S. Pat. No. 5,827,327 to McHaney et al.; U.S. Pat. No. 6,120,532 to Goldfarb; and U.S. Pat. No. 6,270,707 to Hori et al.

BRIEF DESCRIPTION OF THE INVENTION

In an embodiment of the present invention, there is a method for making a polytetrafluoroethylene membrane comprising metal oxide (s). The method may comprise the steps of: (a) mixing a polytetrafluoroethylene resin having a weight, a lubricating agent having a weight, and a metal oxide having a weight, wherein the weight of the lubricating agent comprises between 15 and 25 percent of the weight of the polytetrafluoroethylene resin, wherein the weight of the metal oxide comprises up to 10 percent of the weight of the polytetrafluoroethylene resin, and wherein the metal oxide has at least one dimension less than 100 nm; (b) forming a preform comprising a mixture of the polytetrafluoroethylene resin, the lubricating agent, and the metal oxide; (c) extruding the preform to form a tape having a thickness between 1 and 100 mil; (d) calendaring the tape to facilitate evaporation of the lubricating agent; (e) tentering the tape through biaxially stretching in a first direction and a second direction perpendicular to the first direction to form a membrane; and (f) sintering the membrane at a temperature between 400° F. and 750° F. for a period of time between 1 and 120 seconds, wherein the membrane after sintering has a thickness between 0.05 and 20 mil.

In an embodiment of the present invention, there is a method of incorporating a metal oxide into a mixture comprising a polytetrafluoroethylene resin and a lubricating agent. The method may comprise the steps of: (a) mixing the polytetrafluoroethylene resin with the lubricating agent in a V blender for a period of time between 1 and 60 minutes to form a resin/lubricant mixture; (b) wicking the resin/lubricant mixture for a period of time between 1 and 120 hours; and (c) mixing the resin/lubricant mixture with the metal oxide in a V blender for a period of time between 1 and 60 minutes; wherein a weight of the lubricating agent comprises between 15 and 25 percent of a weight of the polytetrafluoroethylene resin, wherein a weight of the metal oxide comprises up to 10 percent of the weight of the polytetrafluoroethylene resin, and wherein the metal oxide has at least one dimension less than 100 nm.

In an embodiment of the present invention, there is a composition comprising: a polytetrafluoroethylene resin; a lubricating agent comprising an isoparaffinic solvent; and a metal oxide; wherein a weight of the lubricating agent comprises between 15 and 25 percent of a weight of the polytetrafluoroethylene resin; wherein a weight of the metal oxide comprises up to 10 percent of the weight of the polytetrafluoroethylene resin; and wherein the metal oxide has at least one dimension less than 100 nm and has a specific surface area greater than 50 $m^2/g$.

DETAILED DESCRIPTION OF THE INVENTION

Certain aspects of the present invention may related to extruding into tape polytetrafluoroethylene (PTFE) that includes metal oxide nanocomposites, then converting the extruded PTFE tape into a membrane through biaxial stretching.

In certain embodiments, a combination of PTFE and metal oxide(s) (e.g., nanocomposites) may be prepared by dispersing metal oxide(s), such as titanium dioxide ($TiO_2$), zinc oxide (ZnO), aluminum oxides ($Al_2O_3$), magnesium oxide (MgO), silver oxide (AgO), and other nanomaterials, into a mixture containing PTFE resin. The PTFE composite may be then extruded into tape and converted into a membrane by biaxial stretching.

Suitable metal oxides may include, for example, copper(I) oxide ($Cu_2O$); silver(I) oxide ($Ag_2O$); thallium oxide ($Tl_2O$); sodium oxide ($Na_2O$); aluminum monoxide (AlO); barium oxide (BaO); beryllium oxide (BeO); cadmium oxide (CdO); calcium oxide (CaO); cobalt(II) oxide (CoO); copper(II) oxide (CuO); iron(II) oxide (FeO); magnesium oxide (MgO); mercury(II) oxide (HgO); nickel(II) oxide (NiO); palladium (II) oxide (PdO); silver(II) oxide (AgO); strontium oxide (SrO); tin(II) oxide (SnO); titanium(II) oxide (TiO); vanadium(II) oxide (VO); zinc oxide (ZnO); aluminium oxide ($Al_2O_3$); antimony trioxide ($Sb_2O_3$); bismuth trioxide ($Bi_2O_3$); chromium(III) oxide ($Cr_2O_3$); erbium(III) oxide ($Er_2O_3$); gadolinium(III) oxide ($Gd_2O_3$); gallium(III) oxide ($Ga_2O_3$); holmium(III) oxide ($Ho_2O_3$); indium(III) oxide ($In_2O_3$); iron(III) oxide ($Fe_2O_3$); lanthanum(III) oxide ($La_2O_3$); lutetium(III) oxide ($Lu_2O_3$); nickel(III) oxide ($Ni_2O_3$); promethium(III) oxide ($Pm_2O_3$); rhodium(III) oxide ($Rh_2O_3$); samarium(III) oxide ($Sm_2O_3$); scandium(III) oxide ($Sc_2O_3$); terbium(III) oxide ($Tb_2O_3$); thallium(III) oxide ($Tl_2O_3$); thulium(III) oxide ($Tm_2O_3$); titanium(III) oxide ($Ti_2O_3$); tungsten(III) oxide ($W_2O_3$); vanadium(III) oxide ($V_2O_3$); ytterbium(III) oxide ($Yb_2O_3$); yttrium(III) oxide ($Y_2O_3$); cerium(IV) oxide ($CeO_2$); chromium(IV) oxide ($CrO_2$); germanium dioxide ($GeO_2$); hafnium(IV) oxide ($HfO_2$); manganese(IV) oxide ($MnO_2$); plutonium dioxide ($PuO_2$); ruthenium(IV) oxide ($RuO_2$); thorium dioxide ($ThO_2$); tin dioxide ($SnO_2$); titanium dioxide ($TiO_2$); tungsten(IV) oxide ($WO_2$); vanadium(IV) oxide ($VO_2$); zirconium dioxide ($ZrO_2$); antimony pentoxide ($Sb_2O_5$); tantalum pentoxide ($Ta_2O_5$); vanadium(V) oxide ($V_2O_5$); chromium trioxide ($CrO_3$); molybdenum(VI) oxide ($MoO_3$); rhenium trioxide ($ReO_3$); tungsten trioxide ($WO_3$); manganese(VII) oxide ($Mn_2O_7$); rhenium(VII) oxide ($Re_2O_7$); osmium tetroxide ($OsO_4$); ruthenium tetroxide ($RuO_4$); and permutations and combinations of those (and other) metal oxides.

A membrane containing metal oxide(s) may have a high porosity/surface area and may be used, at least in some instances, in the decontamination of chemical and/or biological agents. For example, silver oxide and magnesium oxide may impart antimicrobial properties. For another example, silver oxide (when converted to $Ag^+$ when contacted with water, including, for example, bodily fluids like sweat) may kill microorganisms.

In some instances, the metal oxide nanoparticles may impart properties, such as increased abrasion resistance, increased tensile strength, increased tensile modulus, etc., that may enhance the mechanical stability and/or durability of the membrane.

In certain embodiments, the metal oxide(s) may be, for example, small particles with at least one dimension less than 100 nm. Preferably, the metal oxide(s) have at least one dimension less than 50 nm, and even more preferably the particles have at least one dimension less than 30 nm. Suitable nanoparticles may have a high surface area to volume (or mass) ratio. For example, suitable nanoparticles may have a specific surface area of greater than 10 $m^2/g$, greater than 50 $m^2/g$, or greater than 90 $m^2/g$. In some embodiments, the specific surface area may be about 100 $m^2/g$. A suitable inorganic porous material may comprise zinc oxide Nanopowder available from Aldrich Chemical Co.

In preferred embodiments, certain aspects of the present invention relate to a method of making a PTFE membrane containing a metal oxide. In general, the steps may include one or more of the following steps: (1) mixing PTFE resin with a lubricating agent, then wicking the resin/lubricant mixture; (2) mixing the resin/lubricant mixture with a metal oxide (such as zinc oxide nanopowder); (3) preforming the wet-mixture into a billet; (4) extruding the mixture into tape; (5) calendaring the tape; (6) biaxially stretching the tape to form a membrane; and (7) sintering the membrane to stabilize its microstructure.

Due to the use of a lubricating agent that is removed from the extrudate following the application of heat, this process may be generally known as a "wet-process" and not a "dry-process" (which generally relies on friction-free air blending in an environment without shear).

In an exemplary embodiment, a suitable PTFE resin comprises Dupont Teflon® PTFE 601A, available from E. I. du Pont de Nemours and Co. Other PTFE resins may comprise Daikin F107, Dupont 603A, and/or Dupont 60A. And in an exemplary embodiment, a suitable lubricating agent includes a hydrocarbon-based liquid, such as the isoparaffinic solvents sold under the Isopar tradename by the ExxonMobil Chemical Co. A preferred lubricating agent may comprise Isopar K, Isopar M, and/or Isopar G. The PTFE resin powder may be mixed with the lubricating agent in a V blender for between 1 and 60 minutes (preferably about 30 minutes), for example, until the mixture is approximately homogenous. In certain embodiments, the weight percentage of the lubricating agent may range between 15 and 25% (and all subranges therebetween) of weight of the resin. This weight percentage, which is commonly known as the "lube rate," may vary, for example, depending on the specific processing parameters of the equipment being used in the extrusion process.

Wicking occurs after mixing, and the resin/lubricant mixture may be held at a temperature of 90° F. for 18 hours. In certain embodiments, the temperature may be higher (e.g., 200° F.) or lower (e.g., 40° F.), and the time may be shorter (e.g., 1 hour) or longer (e.g., 120 hours). In other embodiments, the wicking may be optional.

The wicked resin/lubricant mix may then be mixed with metal oxide using a V blender, e.g., at ambient temperature for between 1 and 60 minutes, preferably between 15 and 30 minutes. In some embodiments, the metal oxide comprises up to 10 wt % of the PTFE resin. In other embodiments, the metal oxide comprises up to 5 wt % of the PTFE resin. In yet further embodiments, the metal oxide comprises up to 3 wt % of the PTFE resin.

In certain embodiments, the lubricating agent may assist in dispersing the metal oxide (s). In certain embodiments, the metal oxide may be mixed with the resin and/or lubricant in various permutations. For example, they may be all mixed together at the same time, or the lubricant and metal oxide may be mixed prior to mixing with the PTFE resin.

The resin/lubricant/additive mixture may then be preformed, e.g., through charging into a cylinder, then pressed under pressure to form a preform. In some embodiments, the cylinder may be 50 inches, and the 150 psi of pressure is used to force the mixture into the preform at ambient temperature. Of course, other process parameters may also be used.

The preform may then be extruded into tape, e.g., Ram extruder. In some embodiments, the extrusion occurs at a temperature between 80° F. and 100° F. and at a rate between 80 and 200 in/min. The final thickness of the tape may vary between 1 and 100 mil, preferably between 5 and 75 mil, and even more preferably between 10 and 40 mil. Of course, other process parameters may also be used.

After extrusion, the tape may then be calendared, by passing the mixture through hot calendar rolls to facilitate the obtainment of tape uniformity as well as the evaporation of the lubricating agent. The calendaring may occur at a temperature between 300° F. and 400° F. and at a rate between 10 and 20 ft/min. The calendar rolls may be 20 inches wide, and calendar rolls may be spaced between 10 and 17 mil apart. Of course, other process parameters may also be used.

After calendaring, the tape may then be formed into a membrane via tentering. During this process, the tape is stretched biaxially to form a thin membrane. Preferably, the stretching occurs at a line speed between 30 ft/min and 80 ft/min. Preferably, the stretching occurs multiple times, even in the same direction. For example, the tape may be stretched between 1 and 20 times (preferably between 10 and 12 times) in the transverse direction and between 1 and 5 times (preferably 3 times) in the machine direction. Various temperatures may be used, e.g., between 150° F. and 800° F., such as, for example, at 200° F., at 500° F., at 650° F., or at 700° F. These temperatures may increase or otherwise vary with the stretch cycles.

After tentering, the membrane may be heat treated to stabilize the microstructure of a membrane. This sintering may occur in an oven at a temperature between 400° F. and 750° F., preferably between 650° F. and 750° F., for a period of time between 1 and 120 seconds, and preferably between 10 and 30 seconds. The final thickness of the membrane may range between 0.05 and 20 mil (preferably 2 mil).

Examples were prepared in accordance with an exemplary embodiment of the present invention.

Example no. 1 was prepared with 3 wt % zinc oxide Nanopowder (using the weight of the PTFE resin as the basis). The PTFE resin used was Dupont Teflon® PTFE 601A, and the lubricating agent was Isopar K. The resulting membranes were compared to the specifications for two commercially available PTFE membranes from GE Energy: QMO8 and QMO11.

Example 1

DuPont 601 A resin fine powder was mixed with 20 wt % of Isopar K using a V blender at ambient condition for about 30 min. The resin/isopar mix was wicked at 90° F. for 24 hours. The wicked PTFE/Isopar mix was blended with 3 wt % of Zinc Oxide nanopowder using a V blender for about 15 min. The resin/isopar/zinc oxide was shaped into cylindrical form (perform) by pressure of 150 psi using a billet press. The perform was extruded into a tape at a temperature 80° F. using a Ram extruder. The isopar was removed from the tape by passing it through series of hot Calendar rolls at a temperature of 200° F. The tape was stretched biaxially to form a porous PTFE membrane (stretched 2 times in the machine direction and 8 times in the transverse direction). The microstructure of PTFE membrane was stabilized by applying heat at temperature of 680° F.

The membrane was tested as per product test specifications and compared with GE standard commercialized membrane. It was found that the Zinc Oxide nanopowder additive dispersed uniformly within PTFE matrix and locked in the microstructure.

TABLE 1

Comparison of Example No. 1 with specifications for a standard GE membrane (e.g., QMO 11).

| Properties | Standard GE Membrane Eg: QMO11 | Example No. 1: ePTFE/Metal Oxide Composite Membrane |
|---|---|---|
| Unit weight (oz/yd$^2$) | 0.54 | 0.68 |
| Thickness (mil) | 1 | 1.2 |
| Bubble point (psi) | 19 | 21 |
| Air flow (cfm) | 0.32 | 0.38 |
| Mullen (unsupported) (psi) | 16 | 21 |
| Mullen (supported) (psi) | 70 | 96 |
| Peel strength | | |
| MD (lbf/in.) | 0.34 | 0.54 |
| XD (lbf/in.) | 0.2 | 0.31 |
| Tensile Elongation (%) | | |
| MD | 270 | 220 |
| XD | | |

Tensile strength and elongation were measured using ASTM D5035, and Mullen was measured using ASTM D751-00 Method A, procedure 1.

Example 2

DuPont 603 A resin fine powder was mixed with 22 wt % of Isopar M using a V blender at ambient condition for about 20 min. The resin/isopar mix was wicked at 110° F. for 48 hours. The wicked PTFE/Isopar mix was blended with 7 wt % of Zinc Oxide nanopowder using a V blender for about 30 min. The resin/isopar/zinc oxide was shaped into cylindrical form (perform) by applying pressure of 100 psi using a billet press. The perform was extruded into a tape at a temperature 110° F. using a Ram extruder. The isopar was removed from the tape by passing it through series of hot Calendar rolls at a temperature of 250° F. The tape was stretched biaxially to form a porous PTFE membrane (stretched 5 times in the machine direction and 12 times in the transverse direction). The microstructure of PTFE membrane was stabilized by applying heat at temperature of 720° F.

The membrane was tested as per product test specifications and compared with GE standard commercialized membrane. It was found that the Zinc Oxide nanopowder additive dispersed uniformly within PTFE matrix and locked in the microstructure.

All disclosed and claimed numbers and numerical ranges are approximate and include at least some variation and deviation.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A composition comprising:
   a polytetrafluoroethylene resin;
   a lubricating agent comprising an isoparaffinic solvent; and
   a metal oxide;
   wherein a weight of the lubricating agent comprises between 15 and 25 percent of a weight of the polytetrafluoroethylene resin;
   wherein a weight of the metal oxide comprises up to 10 percent of the weight of the polytetrafluoroethylene resin; and
   wherein the metal oxide is selected from the group consisting of magnesium oxide and silver oxide; and
   wherein the metal oxide has at least one dimension less than 100 nm and has a specific surface area greater than 50 m$^2$/g.

2. The composition of claim 1, wherein the metal oxide comprises silver oxide.

3. The composition of claim 1, wherein the metal oxide comprises magnesium oxide.

4. The composition of claim 1, wherein the metal oxide has at least one dimension less than 50 nm and has a specific surface area greater than 90 m$^2$/g.

* * * * *

UNITED STATES PATENT AND TRADEMARK OFFICE
CERTIFICATE OF CORRECTION

PATENT NO.        : 7,767,745 B2                                                    Page 1 of 1
APPLICATION NO. : 12/037404
DATED             : August 3, 2010
INVENTOR(S)       : Gopakumar Thottupurathu It is certified that error appears in the above-identified patent and that said Letters Patent is hereby corrected as shown below:

In Table 1 at Column 5, lines 17-44, the last row of specification numbers should read --114-- in the column entitled Standard GE Membrane Eg: QMO11 and --78-- in the column entitled Example No. 1: ePTFE/Metal Oxide Composite Membrane Signed and Sealed this Fourteenth Day of September, 2010

David J. Kappos
*Director of the United States Patent and Trademark Office*